Jan. 22, 1935.  K. E. STUART  1,988,819
VALVE
Filed Dec. 19, 1931
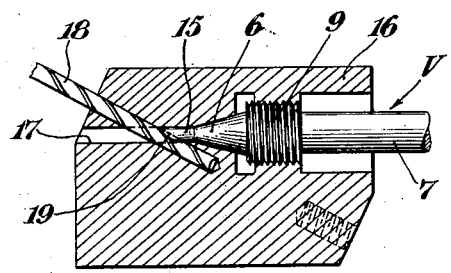
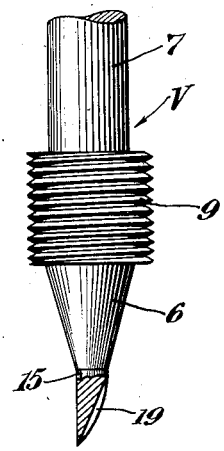
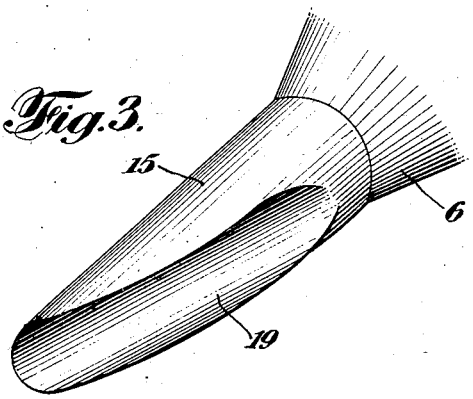
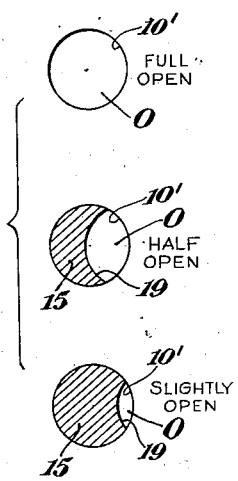
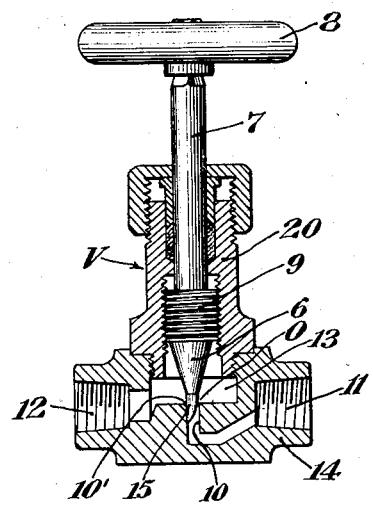
INVENTOR
Kenneth E. Stuart
BY
Edwards, Bower Pool
ATTORNEYS Patented Jan. 22, 1935

1,988,819

UNITED STATES PATENT OFFICE 1,988,819

VALVE

Kenneth E. Stuart, Niagara Falls, N. Y., assignor to Hooker Electrochemical Company, Niagara Falls, N. Y., a corporation of New York Application December 19, 1931, Serial No. 582,031

3 Claims. (Cl. 251—34)

This invention relates to valves and particularly to valves adapted to control or throttle the flow of fluid.

Such valves sometimes have a tendency to clog due, for instance, to an accumulation of an adhering deposit from the passing fluid. Such deposit will more readily form where the valve passage is extremely narrow and the surfaces are close together, and this results in a progressive filling of the opening or slit and a final clogging and stoppage or undesirable variation of the flow.

The object of this invention is to overcome these objections and to provide a valve in which the opening is shaped to give the desired control without this tendency to clog. The cooperating surfaces of the valve and seat are arched away from each other and maintained in this relation throughout the range of the control. This gives the opening a generally circular shape variable in size, but always maintaining a cross sectional area relatively large in proportion to the periphery of the opening.

I have found that this relative reduction of the peripheral surface at the point of contraction and the maintenance of a relatively greater volume of fluid passing obviates the tendency of the surfaces to pick up and accumulate a deposit. Consequently, there is no clogging and the passage is effectively self-clearing at all adjustments of the control.

In the accompanying drawing illustrating one specific embodiment of the invention Fig. 1 is a sectional view of apparatus employed to form the valve surfaces;

Fig. 2 is an elevational view with parts in section showing the control valve;

Fig. 3 is a perspective view on an enlarged scale of the control valve;

Fig. 4 is a diagrammatic view showing successive sections of the valve opening; and Fig. 5 is a vertical sectional view of a valve structure embodying the regulating valve of this invention.

In the valve structure shown in Fig. 5, a fluid entering at 11 passes into the valve chamber 13 of valve body 14 through the control opening O between the valve 15 and the cooperating wall of the cylindrical passage 10, and then out at 12.

The valve member V carrying the valve 15 has a stem 7, handle 8, threaded portion 9 and the conical part 6 for engaging the upper end 10' of the passage 10 to close off the flow after the regulating control valve 15 has reduced it to a minimum.

The threading between the valve member V and the extension 20 gives the valve 15 a longitudinal movement in the passage 10 when the hand wheel 8 is turned and thus varies the opening O due to the inclination of the valve surface 19 with relation to the axes of the valve member and the passage. This variation of the opening O imposes a corresponding variable resistance to the flow for purposes of regulation.

The outer cylindrical surface of the valve 15 has a sliding and turning fit in the passage 10 and the inclined surface 19 of the valve is hollowed out as illustrated in Figs. 3 and 4 so that the opening O is formed between the oppositively concave circular arcs 19 and the arc formed by the wall of the passage 10.

This controlling surface 19 of valve 15 may be cylindrically formed as illustrated in Fig. 1 by mounting the valve member V in a jig block 16 with the valve 15 held in the bore 17 and then drilling the surface 19 by a drill 18 extending into the block and across the valve 15 at an angle or inclination as indicated.

With the valve member V mounted as shown in Fig. 5, the valve has a helical movement in the passage 10 rotating with the valve member V as the handle 8 is turned, and also moving longitudinally along the line of the flow to vary the size of the opening O. When withdrawn upward it entirely clears the passage 10 for full open position as indicated in section in Fig. 4. Then as the valve 15 is moved into the passage 10 it gradually and progressively reduces the opening O through the half open position (Fig. 4) and the slightly open position (same figure) to final closure.

This always bounds the opening O by circular arcs which are gradually reduced while they are still maintained concavely arcuate on each side with relation to the flow passage between them. This cooperation of the two circular surfaces reduces the periphery in contact with the fluid flowing through the valve and avoids altogether the extended narrow slits formed in the usual valve openings between parallel surfaces. The smooth approximately circular form of the opening maintains substantially uniform velocity conditions through the opening and avoids variations from point to point and the consequent slowing down in some portions which would start and build up a clogging deposit. As a result, there is always a sufficient mass and uniformity of the passing flow to keep the opening permanently clear.

I claim:

1. In a valve structure a valve body and a cooperating member relatively longitudinally movable to control the flow through said body and having cylindrical surfaces concavely arcuate at constant curvature around the line of flow between said valve body and member so that the surfaces of said valve body and member approach each other on opposite sides of the line of flow and are increasingly separated at intermediate points, and adjusting means relatively rotating and moving said valve body and member longitudinally in the direction of the flow to change the spacing of said surfaces and vary the cross sectional area of the passage between them at a rate substantially proportionate to the rate of adjustment of said valve while maintaining an oppositely arcuate relation of said surfaces for different rotary and longitudinal adjustments.

2. In a valve structure, a body member, a cylindrical passage therein, a closure member comprising a cylindrical extension fitting snugly within said passage, said extension axially intersected by a groove of constant circular cross section around an axis at an acute angle to the axis of said passage, and means for moving said closure member longitudinally of said passage to open between said body and closure members an aperture bounded by two circular arcs so that the rate of change of area of the opening is substantially proportional to the rate of adjustment of the closure member.

3. In a valve structure, a body member, a cylindrical passage therein, a closure member comprising a cylindrical extension fitting snugly within said passage, said extension axially intersected by a groove of constant circular cross section around an axis at an acute angle to the axis of said passage, and means for moving said closure member longitudinally of said passage to open between said body and closure members an aperture bounded by two circular arcs of substantially equal radii so that the rate of change of area of the opening is substantially proportional to the rate of adjustment of the closure member.

KENNETH E. STUART.